United States Patent
Mayville et al.

(10) Patent No.: US 9,073,512 B1
(45) Date of Patent: Jul. 7, 2015

(54) GAS GENERATING SYSTEM WITH GAS GENERANT CUSHION

(71) Applicant: TK Holdings Inc., Armada, MI (US)

(72) Inventors: Brian A. Mayville, Northville, MI (US); Christian P. Thompson, Rochester Hills, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 13/949,205

(22) Filed: Jul. 23, 2013

Related U.S. Application Data

(60) Provisional application No. 61/674,837, filed on Jul. 23, 2012.

(51) Int. Cl.
| | | |
|---|---|---|
| *B60R 21/264* | (2006.01) | |
| *C06D 5/00* | (2006.01) | |
| *C06D 5/06* | (2006.01) | |

(52) U.S. Cl.
CPC ............... *B60R 21/264* (2013.01); *C06D 5/00* (2013.01); *C06D 5/06* (2013.01); *B60R 2021/2642* (2013.01)

(58) Field of Classification Search
CPC ............ B60R 21/2644; B60R 21/2646; B60R 2021/2648
USPC .......................................... 280/741; 102/530
See application file for complete search history.

(56) References Cited

U.S. PATENT DOCUMENTS

| | | | |
|---|---|---|---|
| 2,985,979 A | 5/1961 | Doyle et al. ........................ 42/96 |
| 3,111,899 A | 11/1963 | Tiedemann ................... 102/342 |
| 3,558,285 A | 1/1971 | Ciccone et al. ............... 422/165 |
| 3,711,115 A | 1/1973 | Lohr .............................. 280/736 |
| 3,785,149 A | 1/1974 | Timmerman .................... 60/205 |
| 3,787,010 A | 1/1974 | Meranshian et al. ......... 244/146 |
| 3,849,923 A | 11/1974 | Hawkins ........................... 42/96 |
| 3,862,866 A | 1/1975 | Timmerman et al. ........... 149/21 |
| 3,880,595 A | 4/1975 | Timmerman et al. ........... 23/281 |
| 3,902,934 A | 9/1975 | Timmerman .................... 149/83 |
| 4,244,295 A | 1/1981 | Shaffer ......................... 102/205 |
| 4,301,732 A | 11/1981 | Van Sickle .................... 102/430 |
| 4,337,352 A | 6/1982 | Naymann ..................... 562/401 |
| 5,221,765 A | 6/1993 | Patil et al. ..................... 562/401 |
| 5,518,054 A | 5/1996 | Mitson et al. ................... 149/35 |
| 5,538,568 A | 7/1996 | Taylor et al. .................... 149/70 |
| 5,670,740 A | 9/1997 | Barnes et al. ................... 149/62 |

(Continued)

FOREIGN PATENT DOCUMENTS

| | | | | |
|---|---|---|---|---|
| DE | 199 50 311 A1 | 10/1999 | ............... | A61K 1/00 |
| WO | WO 97/29151 | 8/1997 | ............... | C08K 3/00 |

*Primary Examiner* — Nicole Verley
(74) *Attorney, Agent, or Firm* — L.C. Begin & Associates, PLLC.

(57) ABSTRACT

A gas generator contains a housing having a first end and a second end; a perforated first combustion chamber contained within the housing; a first gas generant contained within the first combustion chamber; a first gas generant cushion positioned between one of either the first end or the second end, and the first gas generant; and a booster chamber contained within the housing, the booster chamber extending through the first gas generant cushion to physically communicate with the second end of the housing. The gas generant cushion may have at least one concave cavity formed on one side of the cushion for providing an enhanced propellant cushion. A vehicle occupant protection system incorporating this gas generator is also contemplated in accordance with the present invention.

19 Claims, 9 Drawing Sheets

(56) References Cited

U.S. PATENT DOCUMENTS

| | | | |
|---|---|---|---|
| 5,682,014 A | 10/1997 | Highsmith et al. | 149/36 |
| 5,763,821 A | 6/1998 | Wheatley | 149/19.5 |
| 5,861,571 A | 1/1999 | Scheffee et al. | 102/288 |
| 6,068,294 A * | 5/2000 | Jordan | 280/741 |
| 6,077,371 A | 6/2000 | Lundstrom et al. | 149/37 |
| 6,139,055 A * | 10/2000 | Dahl et al. | 280/741 |
| 6,183,008 B1 * | 2/2001 | Prokopec et al. | 280/736 |
| 6,464,254 B2 | 10/2002 | Chikaraishi et al. | 280/741 |
| 6,517,647 B1 | 2/2003 | Yamato | 149/45 |
| 6,527,297 B1 * | 3/2003 | Parkinson et al. | 280/741 |
| 6,540,256 B2 * | 4/2003 | Iwai et al. | 280/736 |
| 6,588,797 B1 | 7/2003 | Blomquist | 280/741 |
| 6,666,476 B2 * | 12/2003 | Rink et al. | 280/741 |
| 6,682,616 B1 | 1/2004 | Yamato et al. | 149/45 |
| 6,739,621 B2 * | 5/2004 | Parkinson et al. | 280/741 |
| 6,752,421 B2 * | 6/2004 | Khandhadia et al. | 280/741 |
| 6,779,812 B2 * | 8/2004 | Ishida et al. | 280/741 |
| 6,800,154 B1 | 10/2004 | Carey et al. | 149/2 |
| 6,886,855 B2 * | 5/2005 | Cheal et al. | 280/741 |
| 6,942,249 B2 * | 9/2005 | Iwai et al. | 280/741 |
| 6,966,578 B2 * | 11/2005 | Smith | 280/736 |
| 7,005,459 B2 | 2/2006 | Hekal | 523/102 |
| 7,134,690 B2 * | 11/2006 | Furusawa et al. | 280/736 |
| 7,185,588 B2 * | 3/2007 | Clark et al. | 102/530 |
| 7,950,693 B2 * | 5/2011 | Jackson et al. | 280/741 |
| 8,240,709 B1 * | 8/2012 | Quioc | 280/741 |
| 8,382,155 B2 * | 2/2013 | Nakayasu | 280/741 |
| 8,424,908 B2 * | 4/2013 | Kobayashi et al. | 280/741 |
| 8,590,929 B2 * | 11/2013 | Nakayasu et al. | 280/741 |
| 8,656,838 B1 * | 2/2014 | Mayville | 102/530 |
| 8,720,944 B2 * | 5/2014 | Kobayashi et al. | 280/741 |
| 8,740,245 B2 * | 6/2014 | Fukawatase et al. | 280/741 |
| 2002/0167155 A1 * | 11/2002 | Nakashima et al. | 280/741 |
| 2003/0146611 A1 * | 8/2003 | Kenney et al. | 280/736 |
| 2006/0016362 A1 * | 1/2006 | Quioc et al. | 102/530 |
| 2006/0220362 A1 * | 10/2006 | Hordos | 280/736 |
| 2007/0039508 A1 * | 2/2007 | Saito et al. | 102/530 |
| 2007/0084532 A1 | 4/2007 | Burns et al. | 149/24 |
| 2007/0113940 A1 | 5/2007 | Burns et al. | 149/75 |
| 2009/0102171 A1 * | 4/2009 | Hordos | 280/741 |
| 2013/0276662 A1 * | 10/2013 | Ohsugi et al. | 102/530 |
| 2013/0276663 A1 * | 10/2013 | Ohsugi et al. | 102/530 |
| 2013/0276664 A1 * | 10/2013 | Ohsugi et al. | 102/530 |
| 2013/0291756 A1 * | 11/2013 | Ohsugi et al. | 102/530 |
| 2014/0123869 A1 * | 5/2014 | Ukita | 102/530 |
| 2014/0144340 A1 * | 5/2014 | Smith et al. | 102/202.9 |

* cited by examiner

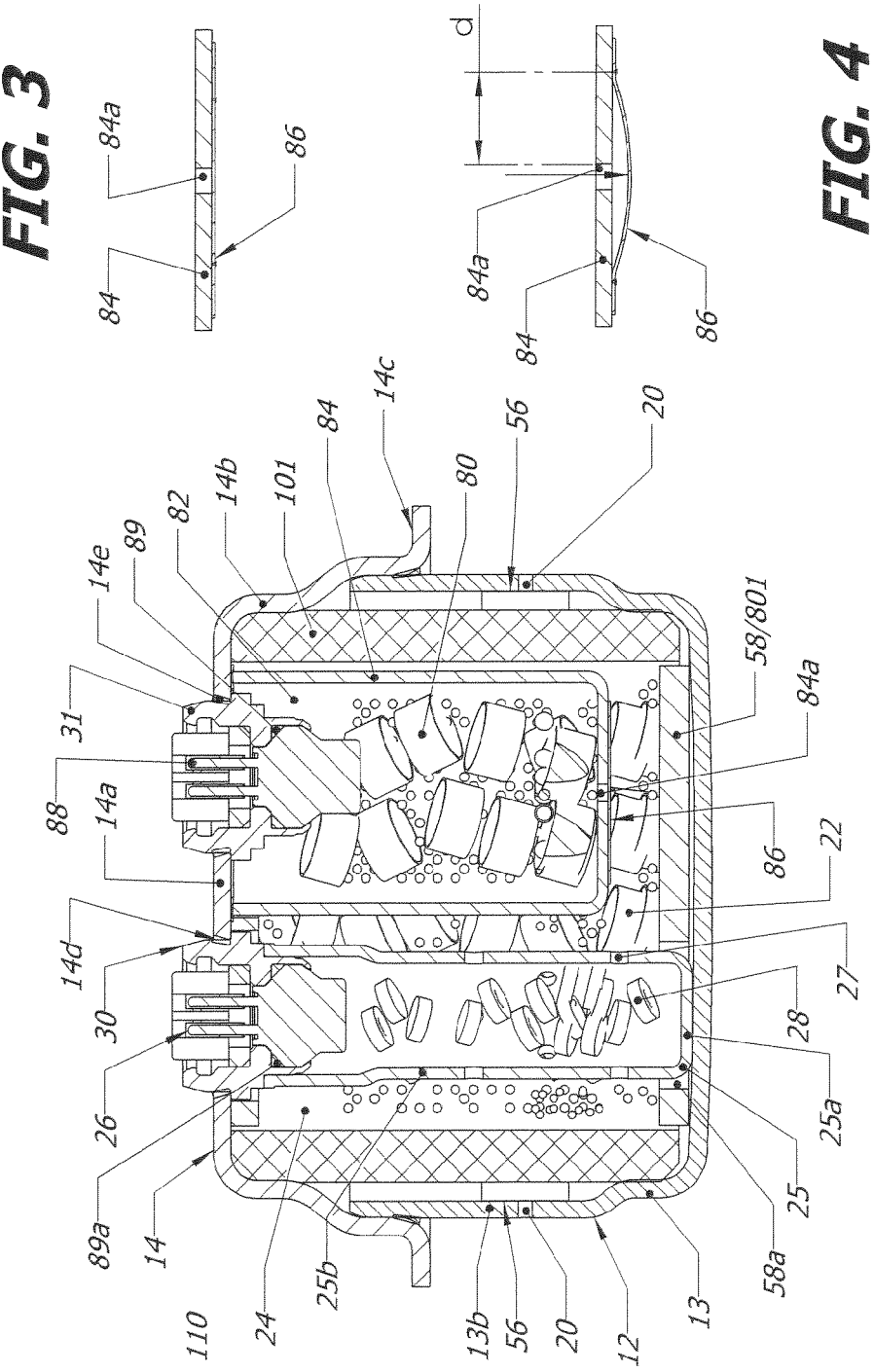

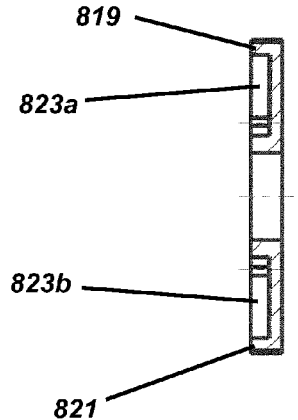
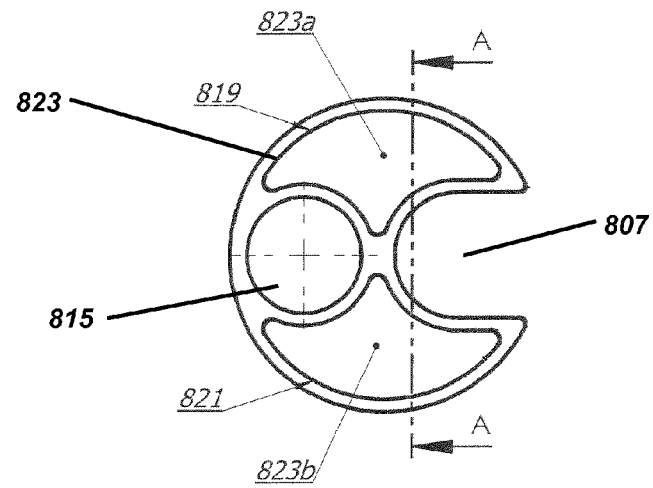
FIG. 7    FIG. 8
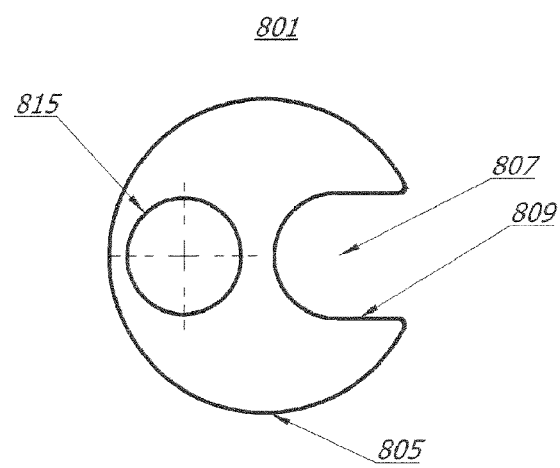
FIG. 9    FIG. 10

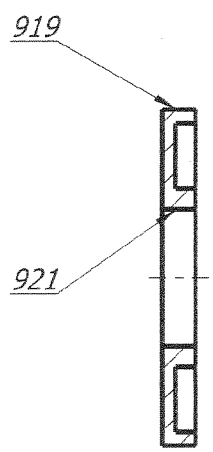
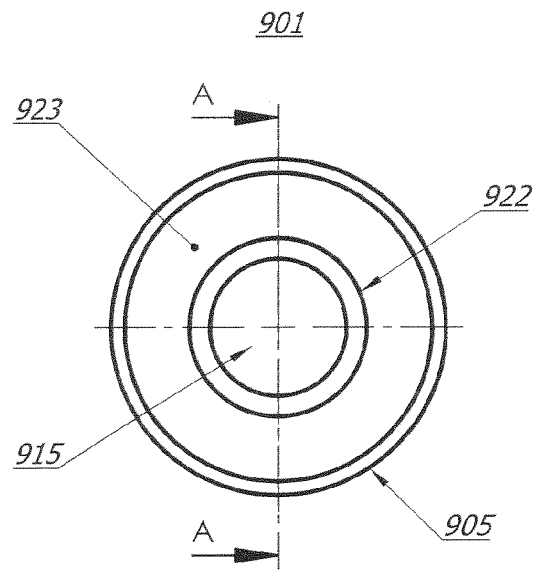
FIG. 14  FIG. 15
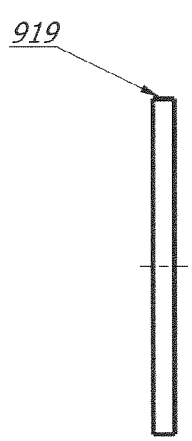
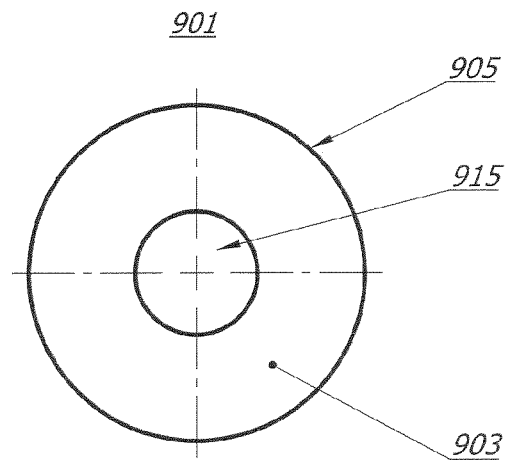
FIG. 16  FIG. 17

GAS GENERATING SYSTEM WITH GAS GENERANT CUSHION

CROSS-REFERENCE TO RELATED APPLICATIONS

The present application claims the benefit of U.S. Application Ser. No. 61/674,837 having a filing date of Jul. 23, 2012.

BACKGROUND OF THE INVENTION

The embodiments of the present invention relates generally to pyrotechnic gas generators for vehicle occupant protection systems, and more particularly to such a gas generator having a cushion interposed between a gas generant material and another portion of the gas generator to help prevent fracture of gas generant grains or wafers due to vibration or impact.

A concern in the performance of gas generating systems is repeatability of performance of the gas generator. Propellant or gas generant springs or cushions are employed in some gas generating system designs to prevent fracture of the propellant due to contact between the gas generant material and the interior of the gas generating system housing. This aids in maintaining a relatively constant propellant surface area of combustion.

Additionally, certain propellants may be hygroscopic wherein the absorption of humidity and/or water may inhibit expected burn characteristics and therefore may result in performance variability of an associated airbag cushion during a crash event. Even though useful in preventing the fracture of propellant, propellant springs or cushions also add to the manufacturing complexity and cost, and to the weight of the overall gas generating system.

Also, in some gas generating system designs, flammable gases may be produced by the heat-related decomposition of certain cushion materials in contact with the gas generating system housing, due to the elevated temperature of the housing after system deployment. It is desirable to minimize the generation of such gases.

SUMMARY OF THE INVENTION

The aforementioned concerns are resolved by a first embodiment of a gas generator containing a housing having a first end and a second end; a perforated first combustion chamber contained within the housing; a first gas generant contained within the first combustion chamber; a first gas generant cushion positioned between one of either the first end or the second end, and the first gas generant; and a booster chamber contained within the housing, the booster chamber extending through the first gas generant cushion to physically communicate with the second end of the housing. Stated another way, a surface of the booster chamber juxtaposes an inner wall of the housing for thermodynamic communication therewith. A vehicle occupant protection system incorporating this gas generator is also contemplated in accordance with the present invention.

A second embodiment of the gas generator includes a housing containing a first end and a second end; a perforated first combustion chamber contained within the housing; a second combustion chamber contained within the housing, said second combustion chamber containing at least one gas exit aperture proximate to said second end of said housing; a first gas generant contained within the first combustion chamber; a second gas generant contained within the second combustion chamber; a first gas generant cushion positioned between one of either the first end or the second end, and the first gas generant; and a booster chamber contained within the housing and extending from the first end to the second end, the booster chamber extending through the first gas generant cushion and in physical communication with the second end of the housing. A vehicle occupant protection system incorporating this second embodiment of the gas generator is also contemplated in accordance with the present invention.

The gas generant cushion or cushions may be shaped as desired. Furthermore, the gas generant cushion(s) may be shaped to fit around structural fixtures present in any inflator. In accordance with the present invention, the present cushion fits about the booster tube or chamber to facilitate physical communication of the booster tube with the outer housing while still cushioning the propellant or gas generant in the same chamber. In the event of high heat, the heat from the exterior of the gas generator or inflator may be transferred from the housing directly to the booster tube. In this way, an auto-ignition/booster composition may then be safely and timely ignited to manage the safe combustion of the other compositions within the gas generator.

In yet another aspect of the invention, a gas generator contains a housing containing a first end and a second end; a perforated first combustion chamber contained within the housing; a first gas generant contained within the first combustion chamber; and a first gas generant cushion positioned between one of either the first end or the second end, and the first gas generant, wherein the first gas generant cushion contains a first inner wall, a second inner wall, and at least one concave cavity defined within at least one of the first inner wall and the second inner wall, or both.

BRIEF DESCRIPTION OF THE DRAWINGS

FIG. 2 is a cross-sectional side view of a gas generating system incorporating a cushion in accordance with a first embodiment of the present invention, with the sealing means on the second chamber differing from the embodiment of FIG. 1.

FIG. 3 is a side view of one variation of the sealing means of the second chamber prior to actuation of the gas generator.

FIG. 4 is a side view of the variation of the sealing means shown in FIG. 3 immediately after gas generator actuation.

FIG. 7 is a cross-sectional side view of the gas generant cushion shown in FIG. 1.

FIG. 8 is a plan view of a first face of the gas generant cushion shown in FIG. 1.

FIG. 9 is an edge view of the gas generant cushion shown in FIG. 1.

FIG. 10 is a plan view of a second face opposite the first face of the gas generant cushion shown in FIG. 1.

FIG. 14 is a cross-sectional side view of the gas generant cushion shown in FIG. 13.

FIG. 15 is a plan view of a first face of the gas generant cushion shown in FIG. 13.

FIG. 16 is an edge view of the gas generant cushion shown in FIG. 13.

FIG. 17 is a plan view of a second face opposite the first face of the gas generant cushion shown in FIG. 13.

DETAILED DESCRIPTION

Figure 1:
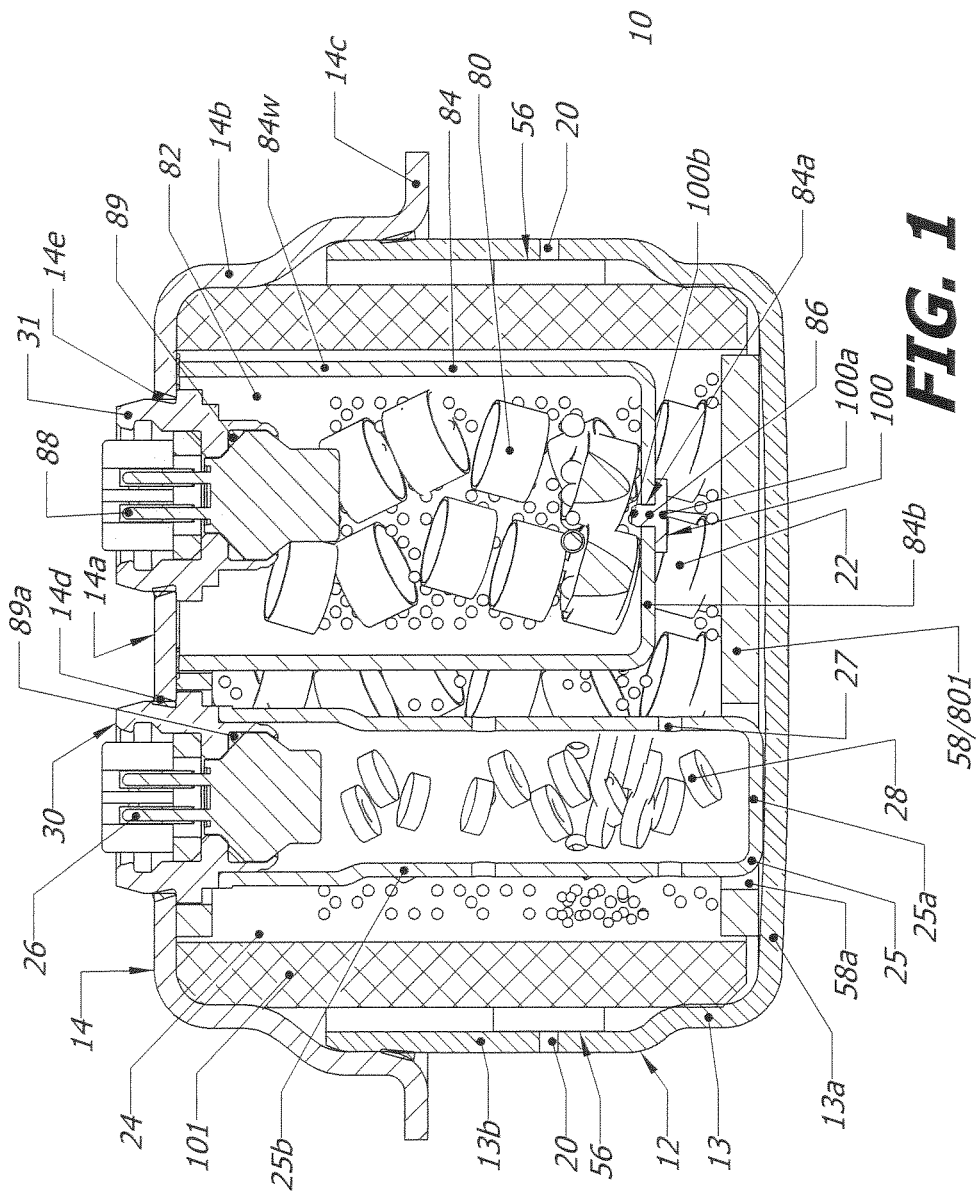
FIG. 1 is a cross-sectional side view of a gas generating system incorporating a cushion in accordance with a first embodiment of the present invention.

Elements and features appearing in FIGS. 13-17 that are the same as corresponding elements shown in FIGS. 1-10 have been given the same reference numerals.

FIG. 1 shows a cross-sectional view of a gas generating system 10 in accordance with embodiments of the present invention. In the embodiments shown, gas generating system 10 is a dual-stage gas generating system including two separate, independently activatable chambers, a primary chamber 24 and an optional dependent or secondary chamber 82. Depending on the amount of gas required for a particular application, chamber 24 may be deployed alone, or chambers 24 and 82 may be deployed sequentially to inflate or otherwise actuate an associated gas-actuatable device. In another operational mode, both of chambers 24 and 82 are deployed simultaneously.

Gas generating system 10 includes a generally cylindrical housing 12 having a first portion 13 and a second portion 14 attached to the first portion. First portion 13 includes a base portion 13a and a wall 13b extending from the base portion. Second portion 14 includes a base portion 14a, a wall 14b extending from the base portion, and a flange 14c extending outwardly from wall 14b. Second portion 14 also has a pair of openings 14d and 14e formed therein to enable the mounting of initiators 26 and 88 in the housing for initiating combustion of gas generant materials positioned in the housing, as described below. When secured together as shown in FIG. 1, first portion 13 and a second portion 14 combine to define a first, primary chamber 24 suitable for receiving therein various components of the gas generating system.

In the embodiments shown, a plurality of openings 20 are formed along first portion wall 13b to permit fluid communication between an interior of the housing and an associated airbag or other gas-actuatable device (not shown). Openings 20 may be covered with a foil or shim 56 formed from a material such as aluminum or stainless steel to prevent the incursion of water vapor into gas generating system housing 12 prior to activation of the system. In one embodiment, the foil 56 (sometimes referred to as "burst foil") is of a thickness in the range of about 0.01 to about 0.20 mm. The foil 56 may be adhered to an interior surface of the gas generating system housing through the use of an adhesive.

First and second housing portions 13 and 14 may be cast, stamped, extruded, molded or otherwise formed from a metallic material or other suitable material or materials. First and second housing closures 30 and 31 are secured to housing second portion 14 within respective ones of openings 14d and 14e so as to form respective fluid-tight seals with the housing portion. First and second housing closures 30 and 31 may be crimped, welded, or otherwise secured within respective openings 14d and 14e of housing second portion 14. Closures 30 and 31 may be cast, stamped, or otherwise formed from a metallic material or any other suitable material or materials.

A first initiator 26 is secured within housing 12 so as to enable fluid communication with a booster material 28 (described below) after activation of the gas generating system. Ignition of booster material 28 ignites the gas generant 22. Initiator 26 is positioned and secured in first housing closure 30 using known methods, such that a fluid-tight seal is formed between the initiator 26 and the first housing closure. In the embodiment shown in FIG. 1, an O-ring 89a is compressed between the initiator 26 and the first housing closure to form the seal. Initiator 26 may be formed as known in the art. One exemplary initiator construction is described in U.S. Pat. No. 6,009,809, herein incorporated by reference.

Referring again to FIG. 1, a quantity of a known or suitable ignition or booster material 28, combustion of which ignites gas generant material 22, may be positioned within housing 12 so as to enable fluid communication between the booster material and gas generant composition 22 upon activation of the gas generating system. In one embodiment, booster material 28 is a known auto-igniting booster material positioned in housing 12 so as to enable thermal communication with the housing after activation of the gas generating system, thereby enabling heat transfer from an exterior of the housing to the auto-igniting booster material using the housing as a heat transfer medium. Alternatively, the auto-igniting booster material may be positioned in housing 12 so as to enable thermal communication with an exterior of the housing after activation of the gas generating system, to enable heat transfer from the exterior of the housing to the auto-igniting booster material using a heat-transfer medium other than the housing. Ignition of the booster material results in ignition of the gas generant material 22, in a manner known in the art. In an embodiment using an auto-igniting booster material, the booster material is formulated to ignite when it reaches a temperature within a predetermined range. The auto-igniting booster material fulfills the functions of both a conventional booster material and a conventional auto-ignition material, enabling ignition of the gas generant material in cases where the housing 12 is exposed to an elevated external temperature resulting from, for example, a flame. This obviates the need for a separate auto-ignition material.

A cup 25 may be positioned within the gas generating system housing to enclose initiator 26 and to house booster material 28. Cup 25 includes a base portion 25a and one or more walls 25b extending from a periphery of base 25a to define, in conjunction with the base portion 25a, an interior of the cup. Wall(s) 25b terminate along edge(s) defining an open end of the cup. In the embodiment shown, the open end of the shell is attached along the edges to housing closure 30 using welds or any other suitable method or methods. Openings 27 are formed in wall(s) 25b to enable fluid communication between an interior of the cup and chamber 24 after activation of the gas generating system. This enables by-products of combustion of booster material 28 to reach the gas generant material 22. Activation of initiator 26 produces combustion of the booster material, thereby effecting ignition of gas generant composition 22 in a manner known in the art. Cup 25 may be stamped, extruded, cast, or otherwise suitably formed and may be made from carbon steel, stainless steel, or any other suitable thermally conductive material. In an embodiment incorporating an auto-igniting booster material, cup base portion 25a may be configured to contact first housing portion 13, thereby facilitating transfer of heat from an exterior of housing 12 through base portion 13a and a cup base portion 25a to the auto-igniting booster material inside cup 25. This enables ignition of the auto-igniting booster material when the gas generating system is exposed to flames.

Gas generating system 10 also includes a first inflation fluid source positioned within the outer wall for releasably storing, generating, or otherwise providing an inflation fluid for inflating an inflatable element (for example, an associated airbag) of a vehicle occupant protection system. In the embodiment shown in FIG. 1, the first inflation fluid source comprises a gas generant material 22 positioned within chamber 24 formed in housing first portion 13.

Gas generant 22 may be any known gas generant or gas generating composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312 each incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. In some embodiments, the need for a filter may be eliminated by using a gas generant material having the above-described combustion characteristics.

Referring again to FIG. 1, a cushion or pad 58 is positioned within chamber 24 proximate an end of housing first portion 12. Pad 58 aids in holding the gas generant material in place and/or in cushioning the gas generant against vibration and impact. In order to facilitate thermodynamic communication or heat transfer from the exterior of the housing 12 to an auto-igniting booster material positioned in cup 25, pad 58 may have an opening 58a formed therein to enable booster cup 25 to contact the first housing portion 13, thereby facilitating heat transfer from the exterior of the housing 12 to the auto-igniting booster material. Pad 58 may be formed from, for example, a ceramic fiber material or any other suitable material. The auto-igniting booster composition or material may be formed as described in co-owned U.S. Pat. No. 8,273,199, herein incorporated by reference in its entirety.

In the embodiments shown in FIGS. 1-10, gas generating system 10 also includes a second inflation fluid source positioned within chamber 24 in fluid isolation from the first inflation fluid source. The second inflation fluid source is provided in order to supplement the inflation fluid provided by the first inflation fluid source in certain applications of the gas generating system, as described below.

In the embodiments shown in FIGS. 1-10, the second inflation fluid source comprises a second gas generant composition 80 positioned within a secondary combustion chamber 82 defined by a shell 84, housing portion 14, housing closure 31 and initiator 88. Thus, in the embodiment shown, chamber 82 is positioned within primary chamber 24, with gas generant 22 positioned exterior of the shell 84. Second gas generant 80 is formulated so as to be ignitable responsive to activation of a second initiator 88 (described below). Similar to gas generant 22 described above, second gas generant 80 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312, each incorporated by reference herein.

Second initiator 88 is secured within housing 12 so as to enable fluid communication with second gas generant 80 after activation of the second initiator. In the embodiment shown in FIG. 1, second initiator 88 is positioned and secured within second housing closure 31 using known methods, such that a fluid-tight seal is formed between the initiator and the second housing closure. In the embodiment shown in FIG. 1, an O-ring 89 is compressed between the initiator 88 and the first housing closure to form the seal. Activation of initiator 88 ignites the second gas generant 80. Initiator 88 may be formed as known in the art. One exemplary initiator construction is described in U.S. Pat. No. 6,009,809, herein incorporated by reference.

Shell 84 includes a base 84b and one or more walls 84w extending from a periphery of the base 84a to define an interior of the shell. Wall(s) 84w terminate along edge(s) defining an open end of the shell. The open end of the shell is attached along the edges to housing portion 14 using welds or any other suitable method or methods. Shell 84 may be formed from a metal, metal alloy, or other suitable material. Shell 84 may be attached to second housing portion 14 by welding or any other suitable method. Shell 84 includes one or more openings 84a configured to enable fluid communication between the interior of the shell and the exterior of the shell. Opening(s) 84a are sized and/or otherwise configured to throttle or impede, in a controlled and predetermined manner, the flow of gases from the interior of the shell to the shell exterior. That is, after the failure of a barrier 86, 100 (described below) positioned to seal opening(s) 84a prior to activation of the gas generating system, the flow of gases through opening(s) 84a may be throttled so as to maintain the pressure within the shell 84 at a value within a range that facilitates adequate and efficient combustion of the second gas generant 80.

Opening(s) 84a are sized so that any increase in pressure that would result from continued combustion of the gas generant is offset or substantially offset by the loss of pressure due to gas flow through openings 84a. In this manner, the shell pressure is maintained at a value within the desired range for efficient combustion of second gas generant 80. This desired pressure range for optimum combustion may be a range within which a self-sustaining combustion reaction in the gas generant will be maintained. In one particular embodiment, the desired pressure range has a lower limit of about 20 MPa.

In one particular application, the target pressure range for efficient combustion has a lower limit of 20 MPa and an upper limit which is determined based on the burst pressure of the structural components forming the second chamber, also incorporating a predetermined safety factor therein.

In other particular embodiments, the target pressure range for efficient combustion has a lower limit of 20 MPa and an upper limit of between 50 MPa and 90 MPa, depending again on the structure of the second chamber and the desired safety factor.

In one particular embodiment, the target pressure range for efficient combustion has a lower limit of 20 MPa and an upper limit of 60 MPa.

Figure 5:
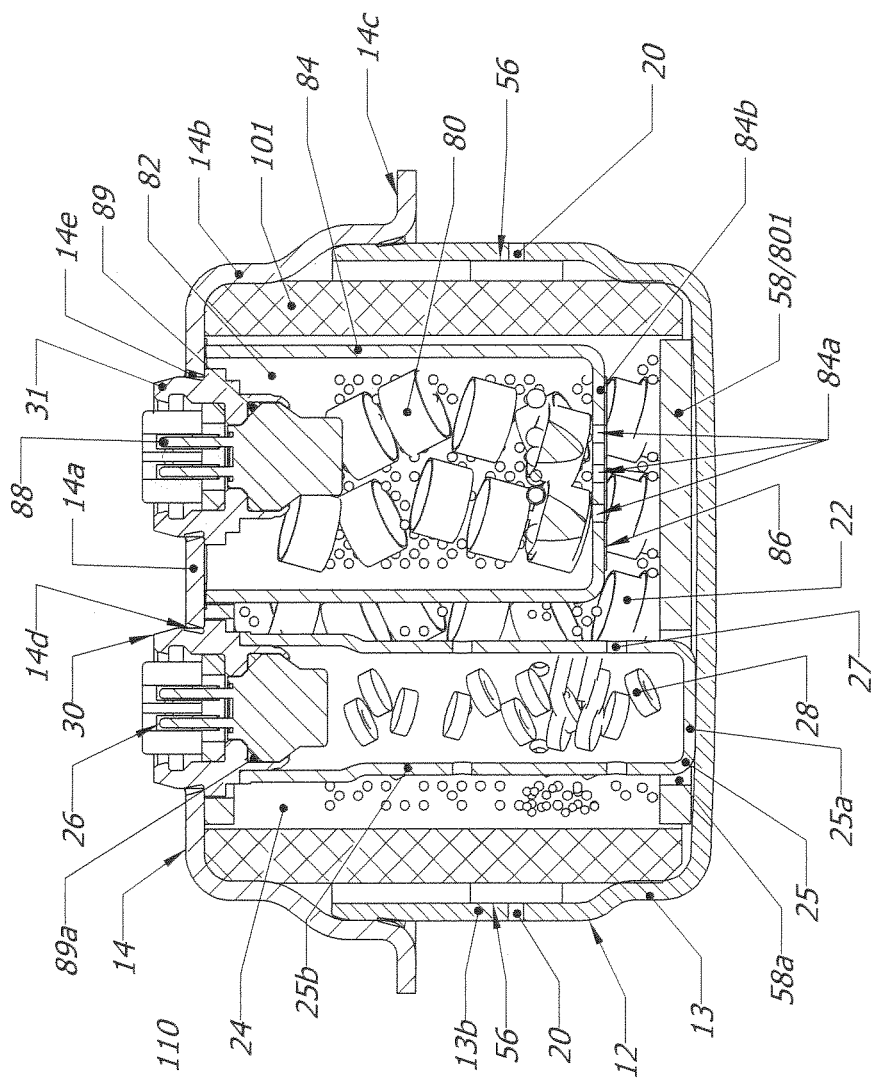
FIG. 5 is a cross-sectional side view of a gas generating system incorporating a cushion in accordance with an embodiment of the present invention similar to FIG. 1.
Figure 6:
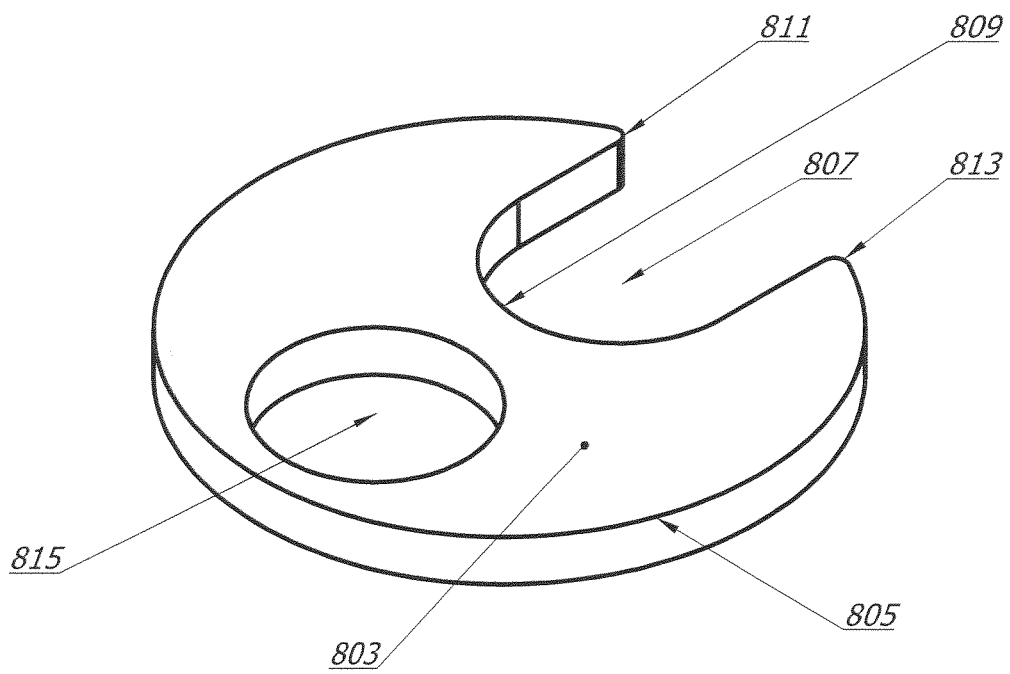
FIG. 6 is a perspective view of the gas generant cushion shown in FIG. 1.

In an alternative embodiment shown in FIG. 5, multiple openings 84a are formed in shell base 84b to enable greater flexibility in controlling the pressure within chamber 82, and to enable the sizes of any barriers 86, 100 applied to seal the openings to essentially encompass a wide variety of sizes and shapes thereby providing a variety of venting schemes or configurations vis a vis apertures 84a.

As also shown in the embodiment of FIGS. 2 and 5, and with reference to FIG. 3, the openings 84a may be sealed with an adhesively applied burst shim 86 (the same reference number for the plug 86 utilized in the embodiment of FIG. 1, as described below). As shown in FIG. 4, an embodiment containing the sealing means 86 of FIG. 2 may result in a stretching of the shim 86 just prior to rupturing of the shim 86.

The size(s) and number of shell opening(s) 84a may also be specified according to the requirements of a particular application, so as to throttle gas flow from chamber 82 to chamber 24 such that a pressure greater than 20 MPa is maintained within chamber 82 for a time period sufficient to permit full combustion off gas generant material 80 when the pressure within chamber 24 is at or about ambient atmospheric pressure (i.e., after most or all of the gas generated in chamber 24 has exited the chamber through openings 20). In this embodiment, the rate of gas flow from the second chamber is throttled so as to maintain the pressure within second chamber 84 within a range suitable for efficient combustion of the second gas generant material 80, for as much of the combustion process as possible. This facilitates efficient combustion of the second gas generant material 80 after first gas generant material 22 has combusted and the resultant generated gases have exited housing 12, at which point the pressure within chamber 24 (and thus, the back pressure acting on a gas exiting shell opening(s) 84a is at or close to ambient atmospheric pressure. This condition may occur, for example, in an operational mode where the second chamber 82 is activated after activation of the first chamber 24.

In particular embodiments, shell base 84b is flat (within the limits of applicable manufacturing tolerances).

In particular embodiments such as that shown in FIG. 1, a single opening 84a is provided in shell 84 for regulating combustion of second gas generant 80. In particular embodiments, the single opening 84a is formed in an embodiment of shell 84 in which base portion 84b is flat, as previously described.

In the manner described above, appropriate sizing of the opening(s) 84a enables the pressure in the shell to be regulated to affect combustion efficiency within the shell regardless of the pressure in the main housing chamber 24. Factors affecting the total area (or areas) of opening(s) needed to provide the effect described above include the total mass of gas generant material to be combusted in the shell, the type of gas generant, the composition of the gas generant, the total surface area of the gas generant material to be combusted in the shell, and other pertinent factors.

It will be appreciated that design considerations such as the total mass of gas generant material to be combusted in the shell, the composition of the gas generant, the total surface area of the gas generant material to be combusted in the shell, and other parameters may be iteratively harmonized to provide a total area of shell opening(s) 84a which impedes gas flow from the shell to the extent necessary to provide conditions within the shell which facilitate efficient combustion of the second gas generant. When properly informed with system performance requirements and data (typically developed in gas generating system design and manufacture) relating to the interactions between these and other design considerations, the actual dimensions of the opening(s) 84a for any particular application may be iteratively or otherwise determined to result in a system that provides efficient combustion of the second gas generant 80. Thus, the dimensions of the opening(s) 84a and the effects of other design variables may be either singularly or jointly evaluated on a trial and error basis for their effects on performance characteristics of the gas generating system. Given information relating to these factors, the total area (or areas) of opening(s) needed to provide the throttling effect described can be detei mined and provided.

Barrier 86, 100 also acts to fluidly isolate second gas generant 80 from first gas generant 22. Barrier 86 is configured to prevent sympathetic ignition of second gas generant 80 in response to combustion of first gas generant 22, by preventing flame and combustion products from combustion of the first gas generant from reaching the second gas generant. Thus, barrier 86, 100 is configured so as not to rupture or fail under elevated pressure and/or temperature in chamber 24 resulting from combustion of gas generant 22.

Barrier 86, 100 also blocks the flow of gases through the opening(s) 84a while shell internal pressure increases during combustion of second gas generant 80. Barrier 86, 100 may be configured to fail at a point after activation of second initiator 88 when the internal pressure in shell 84 has reached a value within the range desired for efficient combustion, and when the pressure differential between chamber 24 and chamber 82 is at a value within a predetermined range. Thus, barrier 86, 100 enables a build-up of internal pressure within chamber 84 to facilitate efficient combustion prior to failure of the barrier 86, 100.

In one particular embodiment, the barrier(s) 86 is configured to fail when the pressure within the interior of chamber 24 is within a range centered about ambient atmospheric pressure and the internal pressure within chamber 82 is at a value within a range determined to promote efficient combustion of the gas generant 80 in the second chamber. As described previously, opening(s) 84a is configured to maintain the pressure within chamber 82 within the range for optimum combustion of gas generant 80 for as much of the combustion operation as possible.

Barrier 86, 100 is positioned so as to block fluid communication between chamber 24 and the chamber 82 (i.e., interior of shell 84, which is positioned within chamber 24). The barrier 86, 100 is configured to block such fluid communication until the barrier is pierced, removed, or otherwise perforated or destroyed by products of combustion of second gas generant 80. This permits release of inflation gas from shell 84 into chamber 24, then out of the housing 12 via gas exit openings 20 into an associated inflatable device. Barrier 86, 100 may be formed from any suitable material, such as a metal, metal alloy, polymer, or other suitable material.

The barrier is considered to have failed when it no longer performs the function of blocking fluid communication between chamber 24 and the interior of shell 84. The actual pressure range at which the barrier fails may depend on the requirements of a particular application. Sealed by barrier 86, 100 and by the attachment of the shell to second housing portion 31, the interior of the shell 84 serves as a combustion chamber for second gas generant 80, as previously described.

Referring to FIG. 1, in one particular embodiment, the barrier 86 is in the form of a plug 100 having a base 100a and a projection 100b extending from the base and insertable into opening 84a formed in shell 84. Plug 100 may be attached to shell 84 by welding, adhesive application, or any other suitable means. Plug base 100a is configured to prevent plug 100 from being pushed into the interior of shell 84 by the elevated pressure generated in chamber 24 during combustion of gas generant 22. In one embodiment, plug projection 100b is configured to be retained within opening 84a using an interference fit. In other embodiments, the plug projection may be retained within opening 84a using another method. Plug 100 fails as a barrier when it is pushed out of opening 84a, when a pressure differential between chambers 24 and 82 reaches a value within a predetermined range. Plug 100 may be formed from any suitable material using any suitable process.

In another particular embodiment shown in FIGS. 2-5, and further to the description given above, barrier 86 is in the form of a shim or strip welded or otherwise suitably attached to an exterior surface of shell 84. As shown in FIG. 4, this embodiment of the barrier 86 is configured to overlap the opening 84a to enable a certain spacing "d" to be provided between the opening and the actual shell-barrier attachment. This enables pressurized gases in the shell to flow through opening 84a and between the barrier and the shell. The elevated pressure from the gases produces a stretching and then a failure (through rupture or fracture) of the barrier 86, thereby permitting gases to flow into chamber 24 and out of housing 12 through openings 20.

In addition to the structures described above, the barrier or barriers 86 used to seal the openings enabling fluid communication between chambers 24 and 82 may have any of a variety of alternative structures and may use any of a variety of alternative securement methods, provided the structure and securement methods used may be tailored to produce a seal meeting the performance requirements of the particular application.

Referring again to FIG. 1, a filter 101 formed from a suitable material (such as wire mesh, for example) may be provided for filtering particulates from the generated gases and/or for cooling the gases. The filter is positioned along a flow path of gases from chambers 24 and 82 to openings 20 so that generated gases are forced to pass through the filter prior to exiting the housing.

Referring to FIGS. 1-10, in accordance with the embodiments of the present invention, a cushion 801 is positioned between gas generant tablets 80 and housing second portion 14, thereby inhibiting fracture of the tablets due to collisions with housing portion 14.

FIGS. 1-10 show several gas generator embodiments having the same one embodiment 58/801 of the cushion structured for use in dual-stage gas generating systems. In the embodiments shown in FIGS. 1-10, cushion 801 includes a base portion 803 having a first outer edge or outer edge portion 805. In the embodiment shown, first outer edge portion 805 has a generally circular configuration shaped to abut filter 101, as shown in FIG. 1. However, the first outer edge portion may have any desired shape.

In addition, a first opening 807 extends into the base portion 803 to form a second outer edge portion 809 joined with the first outer edge portion 805 at corners 811 and 813 In the embodiment shown, second outer edge or second outer edge portion 809 has a generally circular configuration shaped to abut an outer surface of shell 84 or an associated booster tube positioned within housing 12. However, the second outer edge or second outer edge portion 809 may be any desired shape.

A first continuous inner wall 819 extends from and along outer edge portions 805 and 809 and corners 811 and 813. A second opening 815 is also formed in base portion 803 and is spaced apart from first opening 807 by a portion of inner wall 819 interposed between the first and second openings. In the embodiment shown, second opening 815 has a generally circular configuration shaped to abut an exterior surface of cup 25 or an associated booster tube positioned within housing 12, as shown in FIG. 1. A second continuous inner wall 821 extends from and along an edge of opening 815, in the same direction that first wall 819 extends from the outer edges of the cushion.

As seen in FIGS. 1-10, walls 821 and 819 and base portion 803 combine to define a cavity 823 split into two portions or concave cavities, 823a and 823b. Also, as seen in FIGS. 1-10, cushion 801 is oriented within the housing 12 so that cavity portions 823a and 823b face or open toward housing first portion base portion 13a, with only the end portions of walls 821 and 819 touching first housing portion 13. This orientation acts to space apart the bulk of the material forming the cushion from housing 12, thereby reducing the surface area of cushion 801 in contact with the housing. It is believed that this, in turn, reduces the amount of cushion material subject to decomposition resulting from contact with the housing when the housing is at an elevated temperature following deployment of the gas generating system, thereby reducing the decomposition products potentially formed therefrom, and thereby eliminating some less than desirable effects caused by the decomposition products of the cushion. It is also noted that the cushioning effect of the cushion 801 is enhanced due to the greater relative flexibility of the cushion as compared to a cushion having a solid cross-section void of any cavities. Stated another way, the cushion 801 exhibits a higher compliance/lower durometer as it deforms more than a similar cushion formed with a solid cross-section across the diameter of the cushion. The first gas generant cushion 801 also provides insulation between the main gas generant and the housing during periods of inactivity, thereby again reducing decompositions products potentially formed by heat aging of the compositions contained within the gas generator, such as the main or first gas generant. Finally, reducing the amount of raw material within the cushion while yet enhancing the cushioning effects related to maintaining the integrity of the main gas generant shape, results in a reduction in raw material costs while exhibiting an enhanced performance of the cushion 801. Even further, an overall enhanced performance of the gas generator is realized due to repeatability of performance based on shape integrity of the gas generant and also based on minimizing the decomposition products of both the gas generant(s) and the cushion during inactive and actuated conditions of the gas generator.

FIGS. 13-17 illustrate a second embodiment 901 of the cushion similar to the cushion embodiment shown in FIGS. 1-10, but structured for use in an embodiment of a single-stage gas generating system 1010 rather than in the dual-stage system shown in FIG. 1.

Figure 13:
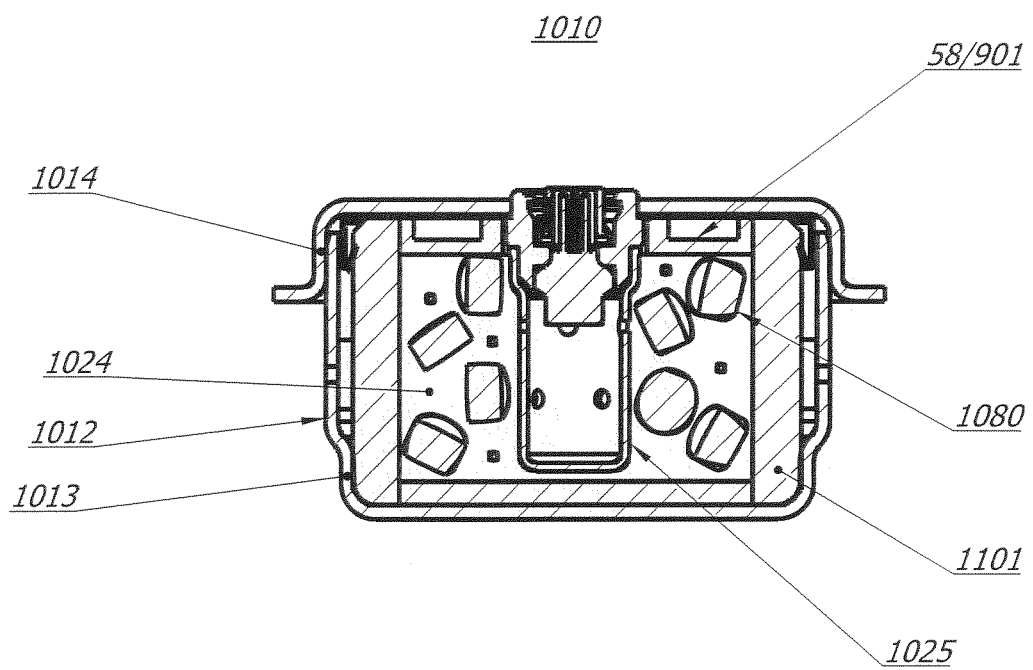
FIG. 13 is a cross-sectional side view of a gas generating system incorporating a cushion in accordance with a second embodiment of the present invention.

System 1010 has a housing 1012 including a first housing portion 1013 and a second housing portion 1014 secured to each other to define an interior cavity 1024. A booster cup 1025 extends from a central portion of second housing portion 1014 and contains a booster material (not shown) for effecting ignition of an associated gas generant material 1080 position in cavity 1024. In the embodiment shown in FIGS. 13-17, cushion 901 includes a base portion 903 having an outer edge or outer edge portion 905. In the embodiment shown, outer edge portion 905 has a generally circular configuration shaped to abut a filter 1101, as shown in FIG. 13. However, the first outer edge portion may have any desired shape.

A first continuous inner wall 919 extends from and along outer edge portion 905. An opening 915 is also formed in base portion 903 and has a generally circular configuration shaped to abut an exterior surface of cup 1025 or an associated booster tube positioned within housing 1012, as shown in FIG. 13. A second continuous inner wall 921 extends from and along an edge 922 of opening 915, in the same direction that first inner wall 919 extends from the outer edge of the cushion.

As seen in FIGS. 13-17, walls 921 and 919 and base portion 903 combine to form a cavity 923. As seen in FIGS. 13-17, cushion 901 is also oriented within the housing 1012 so that cavity 923 faces or opens toward housing second portion 1014, with only the end portions of walls 921 and 919 touching second housing portion 1014. This orientation acts to space apart the bulk of the material forming the cushion from housing 1012, thereby reducing the surface area of cushion 901 in contact with the housing. It is believed that this, in turn, reduces the amount of cushion material subject to decomposition resulting from contact with the housing when the housing is at an elevated temperature following deployment of the gas generating system.

In addition, base portions 803, 903 may resiliently deflect into the space provided by their respective cavities 823 and 923 and toward respective housing second portions 14 and 1014 responsive to forces exerted by the gas generant materials impacting or bearing on the base portions.

In sum, the cushion 801/901 of either the first or second embodiment may be described as a first gas generant cushion positioned between one of either the first end or the second end, and the first gas generant, whereby the first gas generant cushion contains a first inner wall, a second inner wall, and at least a first concave cavity defined within or between at least one of the first inner wall and the second inner wall. Or, the gas generant cushion 801/901 may alternatively be stated to contain a first inner wall, a second inner wall, and at least a first concave cavity defined within the first inner wall and/or the second inner wall.

This may be seen as shown in FIG. 15, wherein at least a first concave cavity 923 is defined between the first and second inner walls 905, 922 wherein an annulus or donut-shaped cushion 901 is depicted. On the other hand, the cushion 801/901 may instead be described as a first gas generant cushion positioned between one of either the first end or the second end, and the first gas generant, the first gas generant cushion 801 containing a first inner wall 819, a second inner wall 821, and a first concave cavity 823*a* defined or formed within the first inner wall 819 and a second concave cavity 823*b* defined or formed within the second inner wall 821. See FIG. 8, for example. Other configurations with various cavities are contemplated.

Embodiments of the cushions may be injection molded or otherwise formed in a suitable manner, and may have a height dimension H and a base portion thickness dimension T tailored specified so as to provide sufficient resilient deflectability to cushion a for a given weight of gas generant material positioned in cavity 24.

In further accordance with embodiments of the present invention, the cushions 801 and 901 may be formed from a composition containing silicone and a desiccating material such as synthetic zeolites or molecular sieves, calcium oxide, and/or calcium sulfate. The compositions of cushions 801, 901 may have a silicone to desiccating material ratio ranging from 10/90 to 90/10, and more preferably has a silicone to desiccating material ratio ranging from 20/80 to 50/50. It will be appreciated that cushions 801, 901 may also be positioned anywhere within their respective inflators 10, 1010 and may provide resilient support wherever required therein. Accordingly, the shapes of the cushion 801, 901 are not limited to the exemplary structures shown. In yet another feature, the cushions also absorb other undesirable gases thereby improving the quality of the gaseous effluent upon gas generator activation. Another feature is that the adsorption of the desiccant is slowed by being mixed within the silicone matrix, thereby preventing excess adsorption of moisture during the assembly of the gas generator. Yet another feature is that the adsorption of undesirable gases mitigates the likelihood of auto-catalyzed decomposition of the "smokeless" main gas generant due to excess buildup of chlorine-containing species, for example. In another feature, the cushions are made from a lightweight material rather than a typical wire mesh material, thereby reducing the overall weight of the gas generators or gas generating systems 10, 1010 associated therewith.

FTIR analysis confirms the efficacy of molecular sieve in absorbing chlorine-containing species. It has been unexpectedly discovered that the incorporation of the desiccant within the cushions 801, 901 inhibits degradation of elastomeric cushions, or a silicon-based cushions, in the presence of chlorine-containing species, thereby enhancing gas generator performance. The elastomeric cushions are thus able to manage the presence of chlorine-containing species during periods of inactivation of the gas generator, notwithstanding the general incompatibility of the elastomer or silicon in the presence of chlorine-containing species. One embodiment of a gas generator includes a gas generating composition, a chlorine-containing auto-ignition composition, and a cushion 801, 901, the cushion 801, 901 including a silicon-based or silicone-based elastomer containing molecular sieve, manufactured as described below. In yet another embodiment, the gas generating composition and the chlorine-containing auto-ignition composition may be the same composition.

The cushions 801, 901 may be formed by mixing a desired amount of the desiccant, synthetic zeolite for example, provided by companies such as Johnson Matthey identified at www.jmgpt.com or GRACE Davison identified at www.gracedavison.com, into a desired amount of uncured silicone. Other desiccants may be provided by known suppliers such as Aldrich or Fischer. Zeolite has been found to be particularly desirable in view of favorable results with regard to heat aging for 400 hours at 107° C. The silicone may then be finally mixed to a substantially homogeneous mixture, and cured according to manufacturer instructions. Silicone is readily available and may for example be provided by companies such as Shin-Etsu of Japan. It will be appreciated that other types of cushions, including ceramic-based cushions may also be employed as described herein.

Operation of one embodiment of the gas generator or gas generating system will now be discussed with reference to FIG. 1.

The gas generating system may be operatively coupled to a crash sensor (not shown) used for detecting the occurrence and severity of a crash event. If the sensor determines that the severity of the crash is above some first predetermined threshold level, the crash sensor may convey an activation signal to initiator 26, thereby activating booster propellant 28 in first chamber 24. By-products resulting from combustion of booster material 28 flow through booster cup openings 27, igniting gas generant 22. The increased pressure in chamber 24 caused by combustion of gas generant 22 causes shims 56 to burst. Inflation gas produced by combustion of the first gas generant then proceeds out of housing 12 through openings 20 into an associated airbag or other gas-actuatable device.

The severity of the crash that is detected by the sensor will determine how the airbag or other gas-actuatable device is actuated. Specifically, if the severity of the crash is only above the first threshold level, then only the first chamber 24 may be activated (as just described) to provide gas to actuate the gas-actuatable device. However, if the severity of the crash is determined to be above the second threshold level, then both the first chamber 24 and the second chamber 82 may be activated to provide gas to actuate the gas-actuatable device. A signal from the crash sensor is then conveyed to second initiator 88, thereby activating second initiator 88 and igniting second gas generant 80. Combustion of the second gas generant is regulated as previously described. Inflation gas produced by combustion of the second gas generant 80 proceeds out through opening(s) 84*a*, then through openings 20 in housing 12 into an associated airbag or other gas-actuatable device. Efficient combustion of the supplemental gas generant 80 is facilitated by appropriately configuring the shell opening(s) 84*a*, as previously described. In an operational mode where both of chambers 24 and 82 are deployed simultaneously, the crash sensor conveys simultaneous activation signals to initiator 26 and to initiator 88, thereby activating booster propellant 28 in first chamber 24 and second gas generant 80. By-products resulting from combustion of booster material 28 flow through booster cup openings 27, igniting gas generant 22. This mode provides simultaneous or overlapping combustion of gas generants 22 and 80. The increased pressure in chamber 24 caused by combustion of gas generant 22 causes shims 56 to burst. Inflation gas produced by combustion of the first gas generant then proceeds out of housing 12 through openings 20 into an associated airbag or other gas-actuatable device.

Initially, prior to the escape of a quantity of generated gases from chamber 24 through openings 20, the pressure differential between combusting chamber 24 and combusting chamber 82 will be insufficient to produce failure of the barrier (i.e., either plug 100 or shim 86 in the embodiments previously described) preventing fluid communication between the chambers. When the pressure in first chamber 24 falls below a predetermined value due to egress of generated gas, a pressure differential will be created between chambers 24 and 82 sufficient to produce failure of the barrier, in a manner previously described. After failure of the barrier, gases generated by combustion of gas generant 80 flow out of chamber 82 through opening 84, into chamber 24, and out of chamber 24 through openings 20 as previously described.

Figure 11:
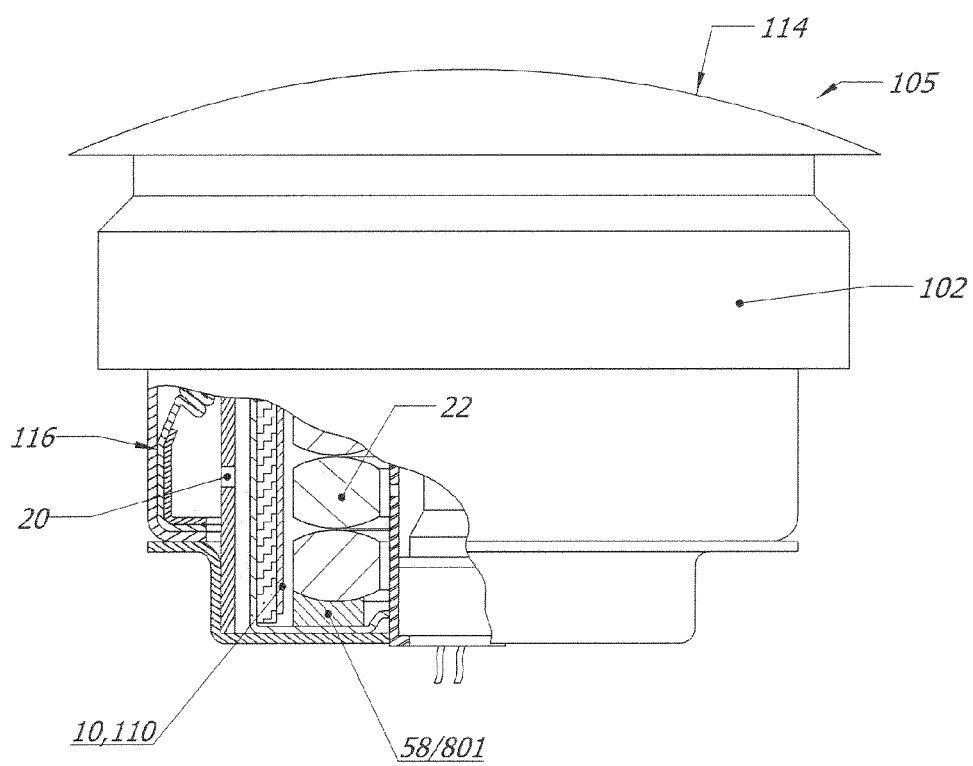
FIG. 11 is a partial cross-sectional side view of an airbag module employing a gas generating system including a gas generant cushion in accordance with yet another embodiment of the present invention.

FIG. 11 shows a particular application of a gas generating system incorporating a combustion control mechanism in accordance with one of the embodiments described above. Referring to FIG. 11, the gas generating system 10, 1010 may be incorporated into a driver side airbag module 105. Airbag module 105 comprises a module housing 102 having a rupturable frontal closure 114, an airbag 116, and a gas generating system 10, 110 in accordance with one of the embodiments previously described. An exemplary gas generating system construction suitable for use in airbag module 105 is described in U.S. Pat. No. 6,422,601, incorporated herein by reference. As described above, gas generating system housing 12 contains openings 20 and 20' (not shown) in fluid communication with an interior of an airbag 116, for effecting discharge of gas produced by gas generants 22 and 80 (not shown).

Figure 12:
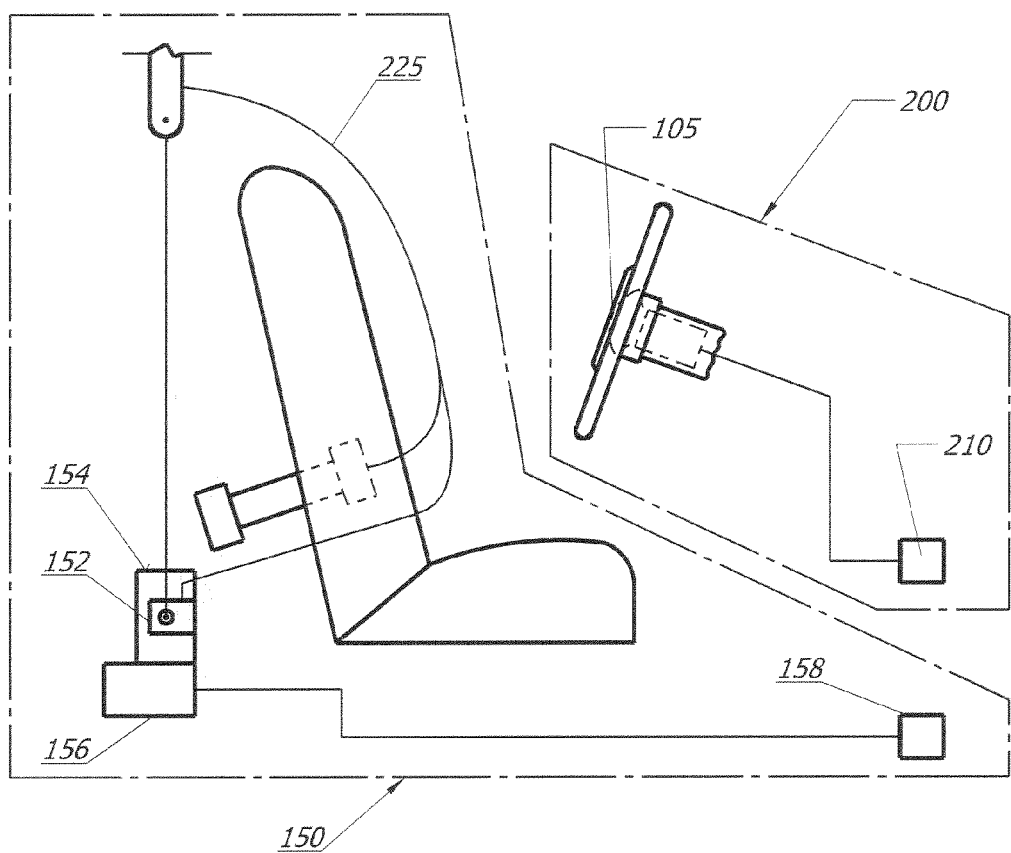
FIG. 12 is a schematic representation of an exemplary vehicle occupant protection system including a gas generator incorporating a gas generant cushion in accordance with an embodiment of the present invention.

Referring now to FIG. 12, airbag module 105 or any of the gas generating system embodiments described above may be incorporated into a broader, more comprehensive vehicle occupant protection system 180 including additional elements such as, for example, a safety belt assembly 150. FIG. 12 shows a schematic diagram of one exemplary embodiment of such a protection system. Airbag module 105 may be in communication with a crash event sensor 210 which is in communication with a known crash sensor algorithm that signals actuation of airbag module 105 via, for example, activation of initiators 26 and 88 (FIGS. 1 and 2) in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743, 480, 5,553,803, 5,667,161, 5,451,008, 4,558,832 and 4,597, 546, incorporated herein by reference. Illustrative examples of typical pretensioners with which the safety belt embodiments of the present invention may be combined are described in U.S. Pat. Nos. 6,505,790 and 6,419,177, incorporated herein by reference. Safety belt system 150 may be in communication with a crash event sensor 158 (for example, an inertia sensor or an accelerometer) including a known crash sensor algorithm that signals actuation of belt pretensioner 156 via, for example, activation of a pyrotechnic initiator (not shown) incorporated into the pretensioner. U.S. Pat. Nos. 6,505,790 and 6,419,177, previously incorporated herein by reference, provide illustrative examples of pretensioners actuated in such a manner.

Other inflation fluid sources are also contemplated for use in the present invention. For example, in an alternative embodiment (not shown), housing 12 may be configured to contain a pressurized gas in the portion of the housing interior which is exterior of shell 85 and cup 25. This gas may be released by rupturing shims 56 in any suitable manner. Alternatively, a vessel containing a pressurized gas may be positioned within housing 12 for use as the first inflation fluid source.

It should be understood that the preceding is merely a detailed description of various embodiments of this invention and that numerous changes to the disclosed embodiments can be made in accordance with the disclosure herein without departing from the spirit or scope of the invention. The preceding description, therefore is not meant to limit the scope of the invention.

What is claimed is:

1. A gas generator comprising:
   a housing containing a first end and a second end;
   a perforated first combustion chamber contained within said housing;
   a second combustion chamber contained within said housing, said second combustion chamber containing at least one gas exit aperture proximate to said second end of said housing;
   a first gas generant contained within said first combustion chamber;
   a second gas generant contained within said second combustion chamber;
   a first gas generant cushion positioned between one of either the first end or the second end, and the first gas generant, the first gas generant cushion including a first inner wall, a second inner wall, and at least a first concave cavity defined within at least one of the first inner wall and the second inner wall; and
   a booster chamber contained within said housing and extending from said first end to said second end, said booster chamber extending through said first gas generant cushion and in physical communication with said second end of said housing.

2. The gas generator of claim 1 wherein said first combustion chamber extends from said first end to said second end, through said first gas generant cushion, and in physical communication with said second end.

3. The gas generator of claim 1 wherein said at least one gas exit aperture of said second combustion chamber is sealed with at least one removable plug prior to actuation of said gas generator.

4. The gas generator of claim 1 wherein said first gas generant cushion is contoured about a portion of a periphery of said second combustion chamber.

5. The gas generator of claim 1 wherein said first gas generant cushion comprises said first concave cavity defined within said first inner wall and a second concave cavity defined within said second inner wall.

6. The gas generator of claim 1 wherein said first gas generant cushion comprises said at least first concave cavity defined within said first inner wall and said second inner wall.

7. A gas generator comprising:
   a housing containing a first end and a second end;

a perforated first combustion chamber contained within said housing;

a first gas generant contained within said first combustion chamber;

a first gas generant cushion positioned between one of either the first end or the second end, and the first gas generant, the first cushion defining at least a first blind cavity therein; and a booster chamber contained within said housing, said booster chamber extending through said first gas generant cushion and in physical communication with said second end of said housing.

8. The gas generator of claim 7 wherein the at least a first cavity opens in a direction toward the one of either the first end or the second end.

9. The gas generator of claim 7 further comprising:
a second combustion chamber contained within said housing; and
a second gas generant contained within said second combustion chamber.

10. The gas generator of claim 9 wherein said second combustion chamber extends through said first gas generant cushion and physically communicates with said second end.

11. The gas generator of claim 7 wherein the first blind cavity is interposed between the first gas generant and the one of either the first end or the second end.

12. The gas generator of claim 7 wherein said first gas generant cushion is formed in the shape of an annulus or donut.

13. The gas generator of claim 7 wherein said first gas generant cushion comprises a first inner wall and a second inner wall, and wherein the at least a first cavity is defined within at least one of the first inner wall and the second inner wall.

14. The gas generator of claim 13 wherein said first gas generant cushion comprises said first cavity defined within said first inner wall and a second blind cavity defined within said second inner wall.

15. The gas generator of claim 7 wherein said first gas generant cushion is formed from desiccant and silicone.

16. A gas generator comprising:
a housing containing a first end and a second end;
a perforated first combustion chamber contained within said housing;
a first gas generant contained within said first combustion chamber; and
a first gas generant cushion positioned between one of either the first end or the second end, and the first gas generant, said first gas generant cushion comprising a first inner wall, a second inner wall, and at least a first concave cavity defined within said first inner wall and/or said second inner wall.

17. The gas generator of claim 16 further comprising:
a booster chamber contained within said housing, said booster chamber extending through said first gas generant cushion and in physical communication with said second end of said housing.

18. The gas generator of claim 16 wherein said first gas generant cushion comprises said first concave cavity defined within said first inner wall and a second concave cavity defined within said second inner wall.

19. A vehicle occupant protection system comprising the gas generator of claim 16.

* * * * *

UNITED STATES PATENT AND TRADEMARK OFFICE
CERTIFICATE OF CORRECTION

PATENT NO.         : 9,073,512 B1
APPLICATION NO.    : 13/949205
DATED              : July 7, 2015
INVENTOR(S)        : Mayville et al.

Page 1 of 1

It is certified that error appears in the above-identified patent and that said Letters Patent is hereby corrected as shown below:

In the Specification

Column 7; Line 60;      Please delete "detei mined" and insert --determined--.

Column 9; Line 6;       Please delete "harrier" and insert --barrier--.

Column 11; Line 33;     Please insert --or-- before specified.

Column 11; Line 34;     Please delete "for a" before given.

Signed and Sealed this
Thirteenth Day of October, 2015

Michelle K. Lee
*Director of the United States Patent and Trademark Office*